United States Patent [19]

Attler

[11] Patent Number: 4,510,690
[45] Date of Patent: Apr. 16, 1985

[54] DIPSTICK GUIDE DEVICE FOR AUTOMOTIVE VEHICLES

[76] Inventor: Anthony R. Attler, 74 Price St., Dobbs Ferry, N.Y. 10522

[21] Appl. No.: 577,983

[22] Filed: Feb. 8, 1984

[51] Int. Cl.³ ............................................. G01F 23/04
[52] U.S. Cl. ............................................... 33/126.7 R
[58] Field of Search .................... 33/126.7 R, 126.7 A

[56] References Cited

U.S. PATENT DOCUMENTS 4,155,167  5/1979  De Lana .......................... 33/126.7 R Primary Examiner—David Simmons

[57] ABSTRACT

This dipstick guide device is for automobile engines, and enables its user to quickly and easily find and enter the dipstick into the tube of the engine for checking the oil level, even at night. Primarily, it consists of a housing secured to the dipstick tube, and a split sleeve is provided on its interior, which includes a curved funnel like opening for guiding the dipstick. The split sleeve is also segmented to spread apart radially when the dipstick is inserted, and is held together by an elastic rubber sleeve on its exterior.

8 Claims, 4 Drawing Figures

DIPSTICK GUIDE DEVICE FOR AUTOMOTIVE VEHICLES

This invention relates to oil level measurement devices for the internal combustion engines of automotive vehicles, and more particularly, to a dipstick guide device for automotive vehicles.

The principal object of this invention is to provide a dipstick guide for automotive vehicles, which will be unique in design, in that it will enable its user to quickly and easily insert the common dipstick into its receiving tube, to check the oil level, which is difficult most of the time, because of the small diameter of the dipstick tube provided for the dipstick, which is common in the art.

Another object of this invention is to provide a dipstick guide device for automotive vehicles, which will also be adaptable for being fabricated integral of the housing structure, during the manufacturing thereof.

Another object of the invention is to provide a dipstick guide device for automotive vehicles, which will include an arcuately walled funnel portion at its upper end, for serving as non-obstructing pathway means for the dipstick being entered therein.

A further object of this invention is to provide a dipstick guide device for automotive vehicles, which will be of such structure, that the funnel portion thereof, will be an expandable insert, comprising a plurality of segments that are closed and retained together as a whole, by means of a sleeve, which will be fabricated of a suitable rubber or other elastic material, such as vinyl.

A still further object of this invention is to provide a dipstick guide device for automotive vehicles, which will also be adaptable for being employed on marine engines, and will be suitably adaptable for checking the transmission fluid level of vehicles.

Other objects of the invention are to provide a dipstick guide device for automotive vehicles, which will be simple in design, inexpensive to manufacture and rugged in construction.

These and other objects will become readily evident, upon a study of the specification, and the accompanying drawing, in which.

Figure 1:
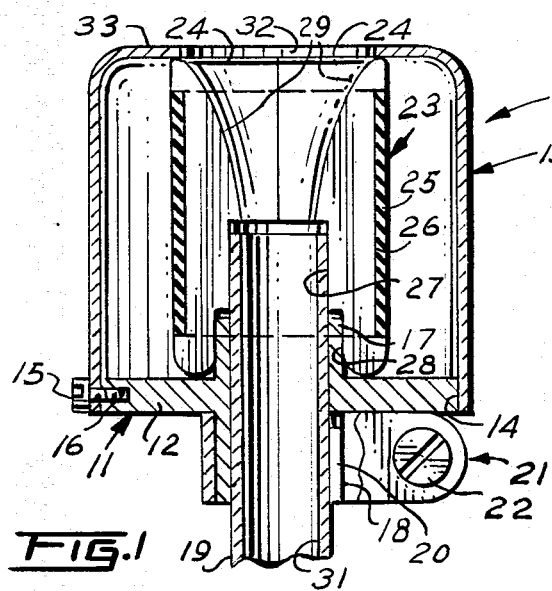
FIG. 1 is a cross-sectional view, taken along the line 1—1 of FIG. 2.
Figure 2:
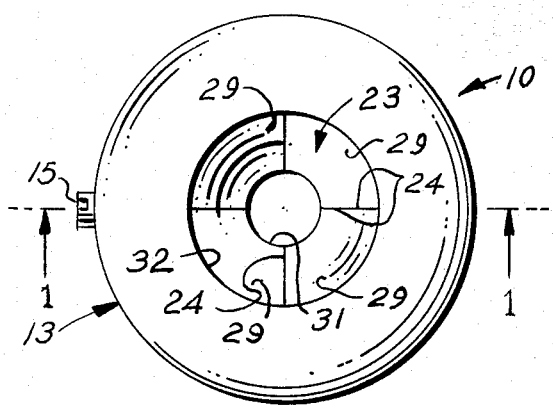
FIG. 2 is an enlarged top plan view of the present invention.
Figure 3:
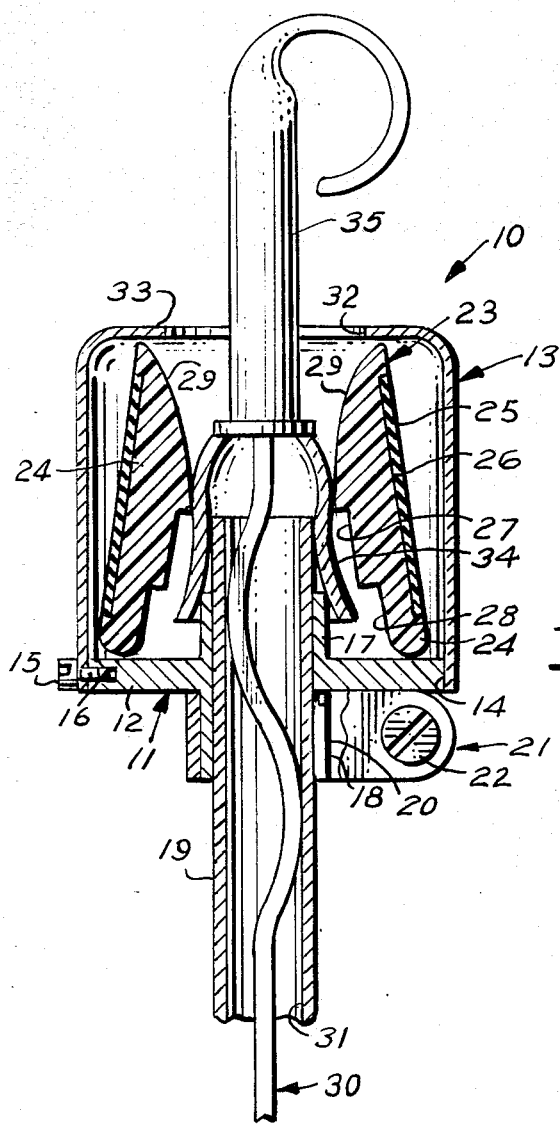
FIG. 3 is similar to FIG. 2, but illustrates the dipstick in fully seated condition, and a pair of the segments are in section, for the sake of clarity.
Figure 4:
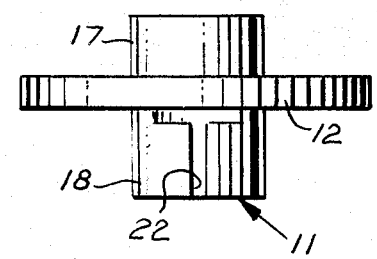
FIG. 4 is a side view of the bottom sleeve, shown in elevation and removed from the assembly.

Accordingly, a guide device 10 is shown to include a bottom sleeve 11, having an annular flange 12, which is integrally attached to its outer periphery. Sleeve 11 is the base of a cylindrical housing 13, and is secured within the bottom opening 14 thereof, by means of a screw fastener 15, which is received in the openings 16 through flange 12 and housing 13. The upper portion 17 and the lower portion 18 of sleeve 11, receives the dipstick tube 19, which is commonly found on internal combustion engines of automotive vehicles and the like, and a "T"-shaped cut-out opening 20 is provided through the lower portion 18 of sleeve 11, so as to enable portion 18 to be clamped by pressure means to the outer periphery of tube 19, through the use of a typical screw clamp 21, having a tightening screw 22.

A plastic split sleeve 23 is provided, and is received on the interior of housing 13. Sleeve 23 is composed of four radial segment 24, which are normally urged together by means of a rubber sleeve 25 received frictional within an annular groove 26 in the outer periphery of split sleeve 23. The bore 27 of split sleeve 23, removably receives the outer periphery of dipstick tube 19, and a larger diameter bore 28 within split sleeve 23, removably receives the upper portion 17 of flange 12 of bottom sleeve 11 of housing 13. The bottom end of split sleeve 23 is rounded for preventing any possible binding of the segments 24 when they are separated and closed together, and the upper surfaces 29 of segment 24, are harmoniously arcuate, and flare outwards to form a non-binding funnel surface in sleeve 23, to easily enter the dipstick 30 into tube 19, and the surfaces 29 align with the bore 31 of tube 19. The upper end of split sleeve 23, is also provided with a radius for non-binding purposes, and the upper end aligns with the central opening 32 through the top wall 33 of housing 13, when the segments 24 are in engagement with each other, which is caused by the rubber sleeve 25 when the dipstick 30 is removed from the device 10. The bell shaped portion 34 of the handle 35 of dipstick 30, engages the arcuate surfaces 29 of the segments 24 of plastic sleeve 23, and cams the segments radially outwards against the tension of the rubber sleeve 29 thereon, and seats on the top of the portion 17 of sleeve 11, and the bottom inner portion of the bell portion 34, engages with the upper end of dipstick tube 19, when dipstick 30 is received within device 10.

It shall be noted, that the segments 24 are also normally urged against the outer periphery of the tube 19, by means of the elastic rubber sleeve 25, when the dipstick 30 is not inserted within tube 19, and the rubber sleeve 25 pressure, will also prevent the plastic sleeve 23 from loosening up. The inside height of the interior of housing 13, is also such, that it is only slightly greater than the full height of the split sleeve 23, so as to limit the up and down movement of sleeve 23, for insuring proper fit on the tube 19.

It shall also be recognized, that securing housing 13 to sleeve 11, is not limited to fastening thereto, by screw fastener 15. Housing 13 may be adapted to snappably engage with the flange 12 of sleeve 11, if desired.

In use, clamp 21 is placed on the outer periphery of the lower portion 18 of sleeve 11, and the installer then removes the dipstick 30 from its tube 19. After the abovementioned, the installer places the sleeve 11 onto the dipstick tube 19, and tightens the clamp screw 22 until the lower portion 18 of sleeve 11 tightens the sleeve 11 securely to tube 19. When the above has been accomplished, the installer then grasps the handle 35 of dipstick 30, and inserts its bottom end through opening 32 of top wall 33 of housing 13, and as the bottom end of dipstick 30 enters, it will strike one of the surfaces 29 of the segments 24, the result being, that the arcuate surfaces 29 will quickly and smoothly cam guide dipstick 30 into the bore 31 of tube 19, with no effort on the part of the user. When the dipstick 30 is being urged downward into bore 31 of tube 19, the bottom portion of the bell portion 34 of dipstick 30, cams against the surfaces 29 of segments 24, and radially and equally spreads segments 24 angularly apart against the pressure provided by the rubber sleeve 25 therein, and this pressure provided, retains surfaces 29 of segments 24, against the outer periphery of the bell portion 34, as long as dipstick 30 remains within the bore 31 of tube 19.

When it is decided to check the oil level of the engine, the dipstick 30 is removed from tube 19 in the usual manner, and is lifted free of device 10. When the above-mentioned occurs, the segments 24 will again close and engage with each other, and again engage tube 19.

While various changes may be made in the detailed structure, such changes will be within the spirit and scope of the present invention, as is defined by the appended claims:

I claim:

1. A dipstick guide device for automotive vehicles, comprising, a bottom sleeve for securing said device to a dipstick tube of an engine, a housing received on said sleeve, a split sleeve received in said housing, providing quick and smooth insertion of said dipstick into said dipstick tube, and a clamp received on said bottom sleeve, for retaining said guide device to said dipstick tube.

2. The combination as set forth in claim 1, wherein said bottom sleeve includes an annular flange, which is integrally attached to said bottom sleeve, and said flange is disposed between the upper portion and the lower portion of said bottom sleeve, and the upper end of said tube is freely received in said upper portion of said bottom sleeve, and said lower portion of said bottom sleeve is received in said clamp, which tightens said lower sleeve to the outer periphery of said dipstick tube, and the bottom open end of said housing is secured to said flange of said lower sleeve, by suitable screw fastener means.

3. The combination as set forth in claim 2, wherein an opening is included through the top wall of said housing, and freely receives said dipstick and a portion of its handle.

4. The combination as set forth in claim 3, wherein said split sleeve is freely received within said housing, and includes four radial segments of equal size, which are disposed on the longitudinal axis of said split sleeve which is fabricated of a suitable plastic material.

5. The combination as set forth in claim 4, wherein said split sleeve includes an annular groove in its outer periphery, and an elastic rubber sleeve is tightly received in said annular groove and forceably retains said segments together, and the lower end of said split sleeve includes a central bore which removably receives the outer periphery of said upper portion of said lower sleeve of said device, and the upper portion of the bore is smaller in diameter and removably receives the outer periphery of the upper extremity of said dipstick tube.

6. The combination as set forth in claim 5, wherein the upper portion of said split sleeve includes an opening, which is defined by arcuate surfaces of each of said segments, and said arcuate surface flare outwards to the top end of said split sleeve, and curve inward at the bottom, and align with the inner periphery of said dipstick tube, which causes the bottom end of said dipstick to be guided straight into the bore of said tube when said bottom end of said dipstick tube strikes said arcuate surfaces, which are harmoniously curved to provide for quick and smooth entry of said bottom end of said dipstick into the bore of said tube.

7. The combination as set forth in claim 6, wherein said arcuate surfaces are quick centering guide means for guiding said bottom end of said dipstick into the bore of said dipstick tube, and the bottom surface of said top wall is stop means against the top of said split sleeve when said dipstick is removed from said device, because of an elevating action on said split sleeve by the lip portion of the bell shaped portion of said dipstick, when said lip portion engages with said arcuate surfaces of said segments of said split sleeve, when said dipstick is lifted from said tube and said device.

8. The combination as set forth in claim 7, wherein said split sleeve tightly engages the outer periphery of said tube by the elasticity of said rubber sleeve when said dipstick is removed from said tube and said device, and when said dipstick is returned into said device and said tube, said lip portion of said bell shaped portion of said dipstick, cams against said arcuate surfaces of said segments and spreads said segments radially and angularly apart from each other against the inherent pressure exerted by said rubber sleeve, and said rubber sleeve continues said pressure against said segments, which remain in engagement with said bell shaped portion of said dipstick, and prevents said dipstick from loosening upwards.

* * * * *